Feb. 13, 1968     A. M. RADER     3,368,832

CONDUIT AND TUBE COUPLING

Filed May 18, 1966

INVENTOR.
ARNOLD M. RADER
BY
Merchant & Gould
ATTORNEYS

United States Patent Office 3,368,832
Patented Feb. 13, 1968

3,368,832
CONDUIT AND TUBE COUPLING
Arnold M. Rader, Minneapolis, Minn., assignor to Minneapolis Gas Company, Minneapolis, Minn., a corporation of Delaware
Filed May 18, 1966, Ser. No. 551,110
1 Claim. (Cl. 285—251)

ABSTRACT OF THE DISCLOSURE

A generally tubular coupling element having axially aligned smooth straight and tapered passage portions cooperating to define an annular shoulder intermediate the ends of the coupling element, the tapered passage portion having a minor diameter at one end of the coupling element for free reception of a tube. A tubular insert element has an inner end portion of uniform diameter to slidably engage the inner passage portion, and outer end portion of uniformed diameter to be slidably received in the tube, and an intermediate externally threaded tapering portion for radially expanding the adjacent portion of the tube into sealing engagement with the tapered passage portion of the coupling element.

---

An important object of this invention is the provision of a coupling having means for connection to a tube, which means will provide an effective seal between the coupling and the tube against leakage of liquid or gases under substantially high pressures.

Another object of this invention is the provision of a coupling having means for supporting a plastic or rubber tube for a nominal length longitudinally outwardly of the sealing area between the coupling and the tube.

Another object of this invention is the provision of a coupling which can be connected to a tube as set forth, without materially damaging or weakening the tube.

Still another object of this invention is the provision of a coupling which provides an effective seal therebetween and tubing of various deformable materials of different degrees of hardness.

Yet another object of this invention is the provision of a coupling which is relatively simple and inexpensive to produce, which is easy to apply to conduit means and tubing, and which is rugged in construction and durable in use.

To the above ends, I provide a tubular coupling element defining an axial passage and having one end portion adapted to be connected to a conduit, the axial passage having a passage wall tapering toward the other end of the coupling element and an annular shoulder facing said other end; and a tubular insert axially movable in said axial passage and including a relatively large diameter inner end portion, a relatively small diameter outer end portion, and an intermediate screw threaded portion tapering from said inner to said outer end portion. The threaded portion of said insert is adapted to engage and radially expand the adjacent end portion of a tube inserted in said other end of the coupling element to said shoulder, until the outer surface of the tube makes sealing engagement with the tapered passage wall of said coupling element, the threads of the insert becoming at least partially embedded in the wall of the tube, the diametrically reduced outer end portion of the insert projecting axially outwardly a substantial distance beyond said other end of the coupling element to support the tube. Further, I provide a sealing ring mounted in the tapered passage portion of the coupling element for sealing engagement with the tube.

The above, and still further highly important objects and advantages of this invention will become apparent from the following detailed specification, appended claims and attached drawings.

Referring to the drawings, which illustrate the invention, and in which like reference characters indicate like parts throughout the several views.

Figure 1:
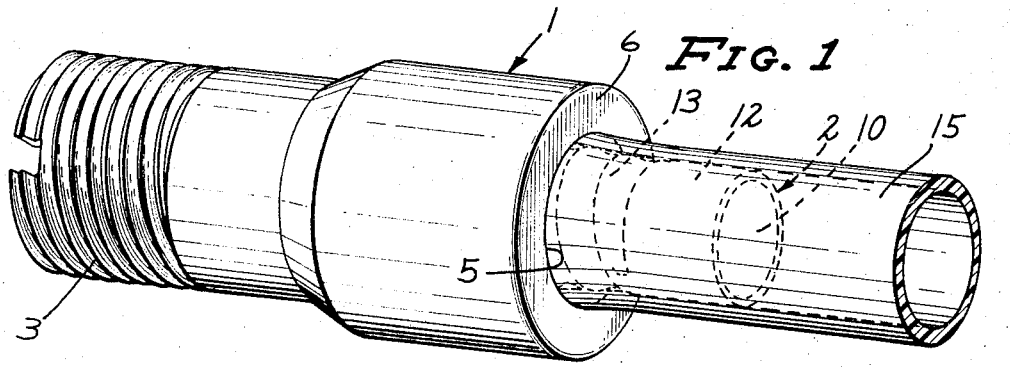
FIG. 1 is a view in perspective of a coupling produced in accordance with this invention, shown as being connected to a tube, shown partly in section.

Referring with greater detail to the drawings, a coupling or connector is shown as comprising a tubular coupling element 1 and a cooperating tubular insert 2. As shown, the coupling element 1 is provided with screw threads or the like 3 by means of which the coupling element 1 may be secured to a standard pipe fitting or like conduit means, not shown. The coupling element 1 defines an axial passage 3 comprising a uniform diameter straight passage portion 4 and a diametrically enlarged passage portion 5 which tapers toward the opposite end portion 6 of the coupling element 1, and cooperates with the straight passage portion 4 to provide an annular shoulder 7 that faces toward the end 6. A radially inwardly opening annular groove 8 is formed in the tapered wall 5 in inwardly spaced relation to the end 6 of the coupling element 1, for reception of an elastic sealing ring 9, in the nature of a conventional O-ring.

The tubular insert 2 defines an axial passage 10 and comprises a relatively large diameter inner end portion 11 slidingly fitting the passage portion 4, a relatively small diameter outer end portion 12, and an intermediate threaded portion 13 which tapers from the inner end portion 11 to the outer end portion 12 of the insert 2. Preferably, and as shown, the external threads of the tapered portion 13 are rounded, so as to prevent injury to the tubing which it is adapted to engage and lock in the coupling element 1. At its inner end, the insert 2 is formed to provide a pair of aligned axially outwardly opening radial slots 14 for reception of the bit of a relatively wide screwdriver or similar tool, not shown. As shown, the diameters of the end portions 11 and 12 are uniform throughout the axial lengths thereof.

Figure 2:
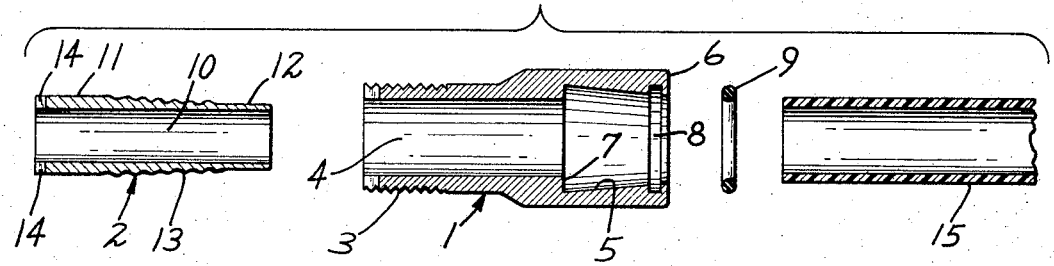
FIG. 2 is an exploded axial section of the parts shown in FIG. 1, on a reduced scale.
Figure 3:
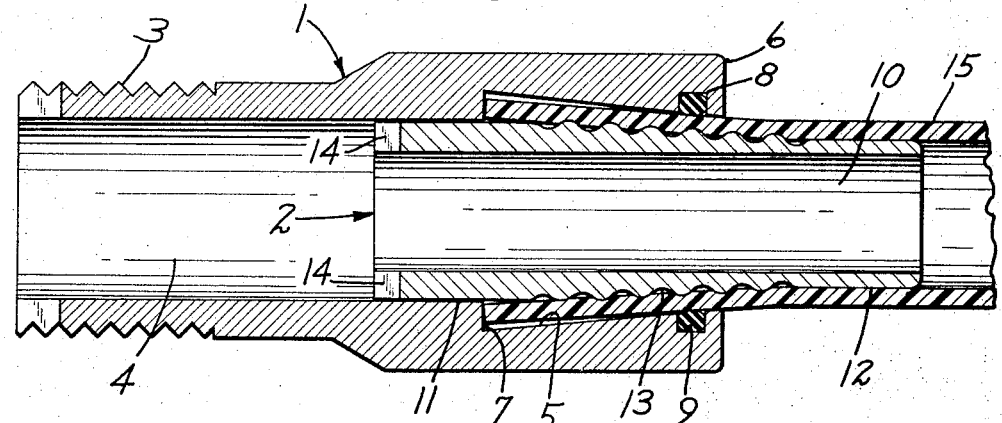
FIG. 3 is an axial section of FIG. 1.
Figure 4:
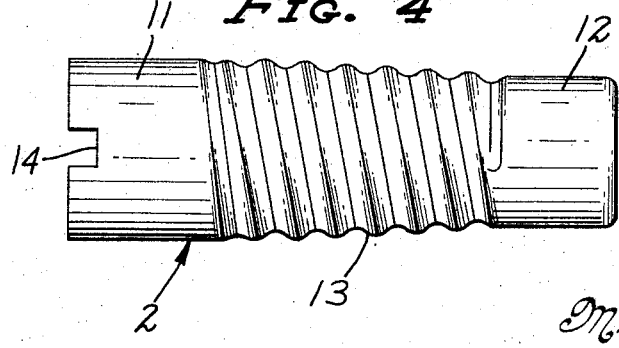
FIG. 4 is an enlarged view in side elevation of the tube expanding insert of this invention.

The above described coupling is particularly adapted for connection to tubing made from rubber, plastics, or softer metals, such as copper, aluminum and the like. The coupling is made in various sizes to accommodate tubing of various inner and outer diameters, a length of such tubing being shown fragmentarily in FIGS. 1–3, and indicated by the reference character 15. Preferably, the tapered passage portion 5 at the end 6 of the coupling element 1 is of a diameter to readily receive the adjacent end portion of the tube 15, the diameter of the passage portion 4 preferably being slightly less than the outer diameter of the tube 15, so that the adjacent end of the tube 15 will abut the annular shoulder 7 when the tube 15 is inserted into the coupling element 1. When the tube 15 is thus inserted, the tubular insert 2 is moved through the passage portion 4 until the outer end portion 12 is received into the tube 15 and the threaded portion 13 engages the adjacent end of the tube 15. Rotary movement is then imparted to the insert 2 by a suitable tool, not shown, whereby the insert 2 is screw-threaded into the tube 15 to cause radial expansion thereof into sealing engagement with at least part of the tapering passage portion 5 of the coupling element 1. As shown in FIG. 3, the outer wall surface of the tube 15 also engages the O-ring 9 to further aid in sealing the connection between the tube 15 and the coupling element 1.

Preferably, the insert 2 as well as the coupling element 1 is made from brass or other material which is harder than that of the tube 15, so that when the insert 2 is screw-threaded into the tube 15, as shown in FIG. 3, the screw threads of the tapered portion 13 become partially embedded in the material of the tube 15. Thus, as rotary movement is imparted to the insert 2 in one direction, the insert 2 works itself longitudinally into the tube 15 to cause radial expansion of the same. It will be further noted, with reference to FIGS. 1 and 3, that, when the insert 2 is threaded into the tube 15 sufficiently to provide a tight seal, the diametrically reduced outer end portion 12 of the insert 2 extends axially outwardly from the adjacent end 6 of the coupling element 1 a substantial distance, whereby to support the tube 15 outwardly beyond the point where it is deformed by the threaded portion 13 of the insert 2, thus minimizing any tendency of the tube 15 to break at the sealing area during use.

It will be appreciated that the sealing ring 9 need not be used when the coupling is attached to a tube 15 of softer materials such as rubber or soft plastics. However, when the tube 15 is of hard rubber or plastics, or of soft metals, the O-ring 9 appreciably aids in providing sealing contact between the outer wall surface of the tube 15 and the adjacent tapered wall surface 5 of the coupling element 1.

This invention has been thoroughly tested and found to be completely satisfactory for the accomplishment of the objectives set forth; and, while I have shown and described a commercial embodiment of my coupling, it will be understood that the same is capable of modification, and that modification may be made without departure from the spirit and scope of the invention, as defined in the claim.

What is claimed is:
1. A coupling for use with a tube of deformable material and of a given diameter and comprising:
   (a) a tubular coupling element having means at one end portion for connection to a conduit and defining axial passage means,
   (b) said passage means including a smooth straight passage portion and a diametrically enlarged smooth passage portion cooperating to define an annular shoulder intermediate the ends of said coupling element and facing toward the other end of the coupling element, said diametrically enlarged portion tapering toward said other end and having a minor diameter to freely receive a tube having a given outer diameter,
   (c) said shoulder providing stop means for said tube,
   (d) and a tubular insert in said passage means and comprising,
      (1) an inner end portion of uniform outer diameter axially slidably fitting said straight passage portion,
      (2) a diametrically reduced outer end portion having a uniform outer diameter to be axially slidably received in said tube,
      (3) and an externally threaded outwardly tapering portion intermediate said inner and outer end portions, the tapering portion of said insert being responsive to screw threading of the insert into the adjacent end portion of said tube to radially expand the same into sealing engagement with the tapering portion of said passage means, and to partially embed the screw threaded portion in said tube,
      (4) said reduced diameter outer end portion of said insert being of an axial length to project axially outwardly a substantial distance from the adjacent end of the coupling element to support said tube when the same is sealingly clamped between said insert and coupling element,
   (e) a radially inwardly opening annular groove in said tapering portion of the passage means closely adjacent said other end of the coupling element, and a sealing ring in said groove adapted to make sealing engagement with the radially expanded portion of said tube.

References Cited

UNITED STATES PATENTS

| | | | |
|---|---|---|---|
| 440,844 | 11/1890 | Hallas | 285—39 |
| 1,830,229 | 11/1931 | Gray | 285—39 |
| 2,219,218 | 10/1940 | Berger et al. | 285—247 |
| 3,051,511 | 8/1962 | Fawick | 285—251 X |

FOREIGN PATENTS 1,014,979   12/1965   Great Britain.

CARL W. TOMLIN, *Primary Examiner.*

THOMAS F. CALLAGHAN, *Assistant Examiner.*